Dec. 12, 1967 R. BEETZ 3,357,836

METHOD AND APPARATUS FOR THE PRODUCTION OF CHOCOLATE MASSES

Filed April 8, 1964 3 Sheets-Sheet 1

INVENTOR.
Rolf Beetz
BY
Beaman & Beaman
Attys

METHOD AND APPARATUS FOR THE PRODUCTION OF CHOCOLATE MASSES

Filed April 8, 1964

INVENTOR.
Rolf Beetz
BY
Beaman & Beaman
attys

INVENTOR.
Rolf Beetz
BY
Beaman & Beaman
attys

United States Patent Office 3,357,836

Patented Dec. 12, 1967

3,357,836

METHOD AND APPARATUS FOR THE PRODUCTION OF CHOCOLATE MASSES

Rolf Beetz, Tonndorfer Weg 17, Hamburg-Rahlstedt, Germany

Filed Apr. 8, 1964, Ser. No. 358,210

Claims priority, application Germany, Apr. 8, 1963, B 71,450

6 Claims. (Cl. 99—23)

ABSTRACT OF THE DISCLOSURE

Method and apparatus for the continuous producing of chocolate masses from individual components utilizing automatic programmed control means and three separate masticating and mixing stations, a main masticating station being of such volume as to receive premixed components in batches to permit continuous discharge from the main masticating station.

In connection with the production of masses from individual components it is known to employ automatic charge type masticators in the form of nontiltable extrusion masticators in which the charging opening is provided at the top and the discharge opening is provided at the bottom of the masticator. These masticators comprise a weighing machine in the form of a substructure, a so-called floor weighing machine, with the aid of which all the components are weighed into the masticating trough, independent of whether the components are present in a dry or liquid condition. These masticators have the disadvantage that they involve intermittently working charging machines while the rolling mills charged by the masticator are operating continuously, which means that a continuous charging would be more compatible with the rolling mills.

In order to approximately balance this discontinuity of the charging operation, it is furthermore known to arrange two automatic charging masticators in a series whereby a rather continuous flow to the charging device for the rolling mills is obtained. These "tandem"-plants are inhibited by the drawback that each masticator also requires a weighing machine. If the tandem-plants are controlled via punch cards, furthermore, two punch card control means or a remote control from a central operator's set will be required. Such tandem plants are rather costly.

It is furthermore known to use masticating systems working to the pipe or cannon ball principle to continuously charge a conveyor belt. With this process, the dry and liquid components are charged on the one end and the finished-masticated mass is extruded at the other end of the masticating pipe. The known processes are inhibited by the drawback that the dry components, namely, in the case of chocolate production, powdered sugar and powdered milk, are weighed with the aid of continuous metering band type weighing machines the weighing error of which being $\pm 1\%$, is relatively high. The accuracy of the addition of liquid components, namely, in the case of chocolate production, cocoa mass and cocoa butter, is not much better because here the metering is carried out with the aid of liquid pumps by volume. The actually added weight thus fluctuates in dependence upon the temperature of the mass.

It is an object of the invention to remove these disadvantages. In this connection, it starts from the fact that a bunkering of the masticated mass cannot be taken into consideration because the mass will become too soft with further movement and, therefore, will no longer be ideally suited for rolling. The components of the mass should be weighed very accurately and the masticated mass be placed onto the conveyor belt, if possible, with no delay.

In accordance with the invention, the problem is solved by a method comprising the steps: preselecting the weights of the individual components by means of a program switching device, weighing said components in a predetermined sequence; premixing them in a premasticator when the adjusted total weight has been reached, the premixing operation is continued until after the expiration of an adjustable time interval; passing the mass to a main masticator; said main masticator receiving several premasticated charges and carrying out the main masticating operation during an adjustable time interval; and the mass is thereupon continuously charged into an after-masticator wherein the mass is once more masticated and from which it is issued continuously onto a conveyor belt.

In accordance with the invention, the conponents are weighed after the premasticator has been previously emptied. The amount of the mass present in the main masticator is sensed by a level scanner which, when a preselected interval of level is exceeded or not reached, throttles or increases the mass supply from the premasticator. The mass passed on to the after-masticator from the main masticator per unit of time is adjusted in dependence upon the composition of the mass. The mass charged into the main masticator from the premasticator per unit of time is also adjusted in dependence upon the mass charged into the after-masticator from the main masticator per unit of time.

By the process in accordance with the invention it is obtained that a certain balance is established in the main masticator. The mass added from the premixing stage is about of the same volume as that one continuously leaving the main stage. As various types of chocolate have different masticating times, for instance, a bitter chocolate only needs a masticating time of about 15 minutes and a milk chocolate a masticating time from 20 to 25 minutes, the masticating intensity may additionally be varied in accordance with the invention by varying the speed. With a higher speed, the masticating effect is correspondingly increased so that a constant performance is obtained with various masses.

Further details and advantages of the method in accordance with the invention as well as a device to carry out said method will be described with the aid of the figures of the drawings. In the drawing a method to produce a chocolate mass has been selected as an example. In the drawings.

Figure 1:
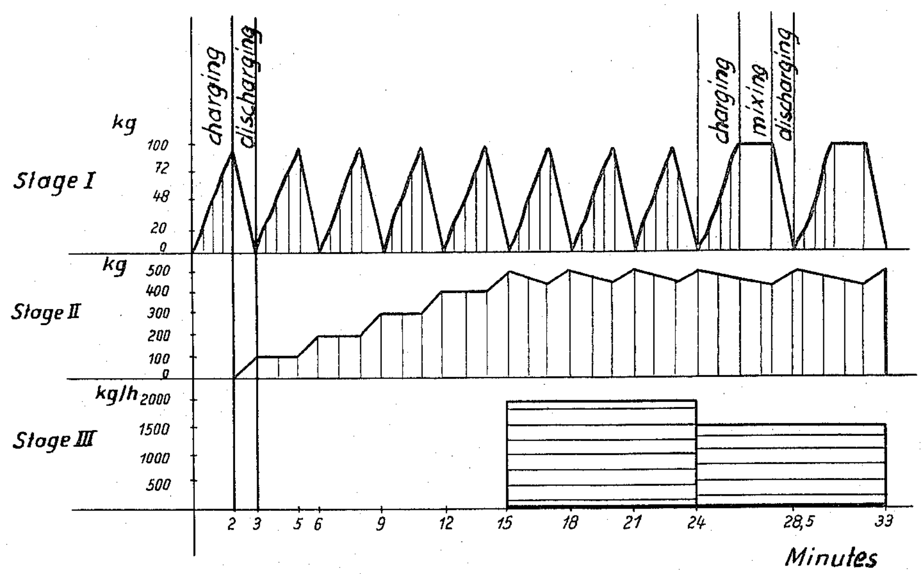
FIG. 1 shows a diagram including the various stages of the method.

FIG. 1 shows the amounts of the mass or the amounts per unit of time, respectively, for the individual stages plotted against time. In the embodiment shown by way of example, the premixing and weighing stage which is designated stage I, is supplied with four components in succession. In this connection, it is assumed that stage I may hold a mass of 100 kg. To produce a chocolate mass, for instance, at first a proportion of 20% cocoa butter, then a proportion of 12% cocoa mass and then a proportion of 22% milk powder and, finally, a proportion of 46% powdered sugar are added. These proportions are weighed one after the other in the premixing stage; after the expiration of about 2 minutes, all the components will be present in the premixing stage. Any additional mixing may be omitted during the starting period because the mass will be discharged from the main masticating stage into the after-masticating stage only after the main masticating stage has been completely filled. In the example that has been selected, this will occur after the premixing stage has been emptied five times into the main masticating stage which will have been done after an overall period of about 15 minutes. From this time on, 400–500 kg. of mass will always be present in the main masticating stage. For the after-masticating stage, the mass extruded per unit of time has been plotted. This mass will be of an order of size of about 2,000 kg. per hour from the 15th minute on, i.e. that moment at which a supply is effected from the main masticating stage into the after-masticating stage for the first time. If an additional mixing operation is still carried out in the premixing stage which is assumed to be of a duration of 1½ minutes and is shown to take place from the 24th minute on in the example, the performance of the after-masticating stage will naturally drop, because now a reduced amount of mass is supplied only per unit of time in comparison with the beginning. Therefore, the mass discharged from the after-masticating stage is variable in dependence upon the time consumed in the mixing operation in the premixing stage.

Figure 2:
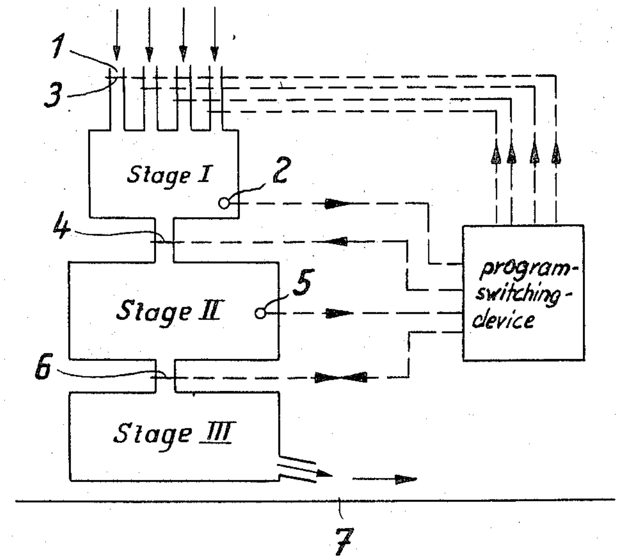
FIG. 2 is a block diagram from which the control via a program and the mutual influence of the individual stages on one another may be seen.

In the following, the run-off of the process in accordance with the invention will be described with the aid of the scheme shown in FIG. 2. The components necessary to form the mass are successively charged into stage I, the weighing and premixing stage, through the filling funnel 1. In so doing, the charging is effected in such a manner that at first the first component is charged into the stage I, the weighing of the component 1 being effected in the metering stage I with the aid of a weighing machine 2 diagrammatically shown, and, when the amount selected in the program switching device is reached, the first slide 3 is closed, said slide controlling the supply of the first component, with the slide charging the second component into the stage I being simultaneously opened. Summation of component 1 and component 2 is effected through the weighing machine, and, when the predetermined amount for the component 2 is reached, the slide associated with the component 2 will be shut and the slide associated to the third component will be opened etc. The connections of the control are shown by broken lines with arrows for the direction of effect. After the amount necessary to fill stage I has been received upon the weighing machine 2, opening of the slide 4 and feeding of the mass premixed in stage I into stage II which is the main masticating stage, will be produced under the control of the program switch. In this operation, it is also possible to carry out the operation of the slide 4 with a time delay after the amount preselected for stage I has been reached, in such a manner that an additional premixing is carried out in stage I before the mass is fed on to the stage II. The overall filling time for stage I and the passing on to stage II takes about 3–6 minutes with a capacity of the premixer of 100 kilos.

In stage II, the main mastication will be carried through, with the maximum volume of said second stage constituting a multiple of the volume of stage I, namely about five to six times as much. In this stage, the mass is intensely processed for a longer period of time which may be regulated. When starting, the mass will remain in stage II until such time as this stage has been completely filled, that means until stage I will have been emptied into stage II about five to six times. Once the main masticating stage has been filled completely, a level control will be effected through level regulator 5 which is diagrammatically shown; because a uniform level in stage II is of utmost importance for the thorough mastication of the mass. If the level in the main masticating stage exceeds certain limits or does not reach them, this will be reported to the program switching device which effects an adjustment of the slide 4 so that an increased or decreased amount of mass will flow from the stage I to stage II depending on whether the level in stage II has exceeded the predetermined limit or not reached it.

For final mastication and for continuous discharge from stage II, stage III, the so-called discharging and after-masticating stage is arranged next in line to the stage II. After an adjustable period of time, mass will arrive from stage II via a slide 6 into stage III where the mass is once more thoroughly masticated and then placed onto the conveyor belt 7. The position of the slide 6 is likewise reported to the slide 4 via the program switch because of which the supply from stage I via the slide 4 is also dependent on the position of the slide 6 which controls the discharge from stage II into stage III. A mouthpiece is provided at the end of stage III through which a smoothed strand is placed onto the conveyor belt 7, which generally is a steel strip. As the performance of the rollers arranged next in line (not shown) is fluctuating in dependence on the masses to be processed, the slide 6 must be adapted to the adjustable. Here, the slide 6 is adjusted via a program switch in dependence upon the type of the mass so that the mass will arrive in the stage III from stage II in dependence upon the position of said slide 6. The mass arrives then at the rollers for further processing via the conveyor belt 7.

Figure 3:
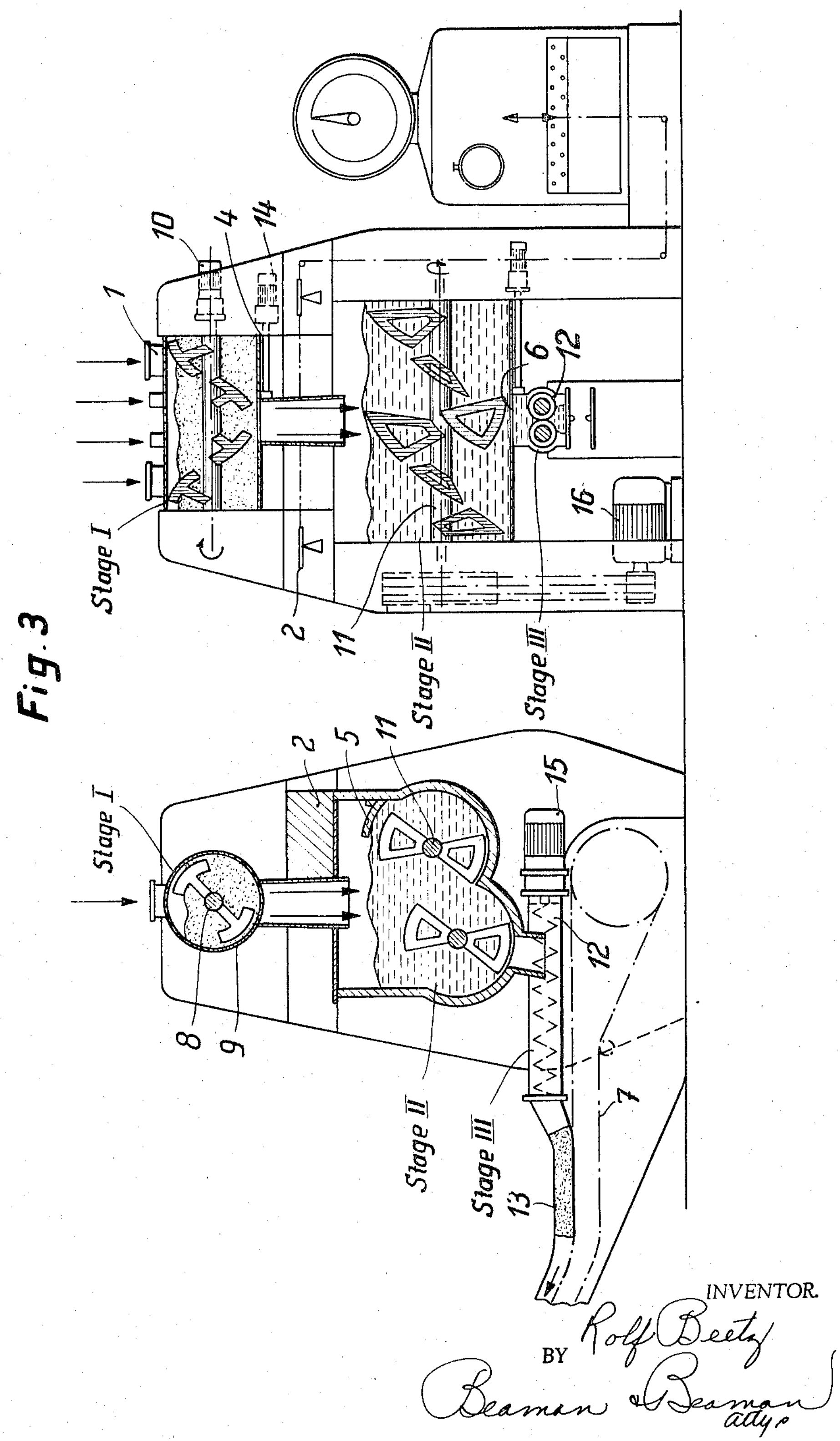
FIG. 3 shows partially sectioned front and rear views, respectively, of an apparatus to carry out the process.

FIG. 3 shows partially sectional side and front end views, respectively of a device to carry out the process in accordance with the invention. For a preweighing and premixing stage, i.e. stage I, a one-shaft machine 8 with circular-shaped trough 9 is provided. It has been found that with automatic charge masticators designed as double-shaft charge masticators, the weighing was badly influenced by the to and fro movement. The agitation and thus the weighing inaccuracy may assume such a degree that the machine will no longer be capable of working properly. The one-shaft plant provided in accordance with the invention comprising a circular-shaped trough, however, no longer presses the mass to and fro and does not permit it to rise, thus no longer influencing the weighing process. Owing to the small weight of the mass weighed in the premixing machine which is not in excess of five to six-times the content of the machine, a further enhancement in accuracy is obtained. If stage I is to be preheated with steam or water, it will be possible to provide here a double wall. Preferably, however, stage I consists of only one wall because a thorough mastication is no longer necessary in this stage. It will be to the purpose to design the machine very sturdy and of low height to achieve the lowest possible point of gravity. Thereby, a tilting moment is practically precluded. As furthermore, a high speed belt drive might affect the suspension of the weighing machine, the first stage is preferably provided with a gear motor 10 and a slow-running chain drive arranged therebehind to drive the mixing shaft. All these points together bring about the highest possible weighing accuracy, the errors of which do not exceed a value of $\pm 0.3\%$.

The main masticating stage involves a known double-shaft masticating machine 11. However, in order to avoid the phenomenon that the material is not completely transported forwardly from the rear trough in a shovelling action, especially when the mass has become softer, the circles of rotation are arranged in such a manner that they are intersecting each other. In stage II, the maintenance of the level is of special importance: First, it must be avoided that the first stage should transfer the 100 kilos portions in too quick a sequence to the second stage thus overfilling said main masticating machine. If an amount of 500 to 550 kilos is present in the second stage, the supply of the first stage will have to be slowly fed to the second stage. Said limitation is controlled by sliding shoes 5 which are arranged to the right and to the left hand side walls above the rear trough. Secondly, care must be taken to prevent too low a filling volume in the second stage which would reduce the masticating effect, and in such event the charging from the first stage is effected more quickly. Level regulator shoes 5 are shown in FIG. 3 at the full position which controls slide 4 through the program switch.

In order to remasticate the mass once more, a double-shaft screw conveyor 12 is provided in the after-mastication and discharging stage, i.e. stage III. With this screw conveyor the circles of rotation are also intersecting. The after-processing of the mass in the after-mastication stage ensures that the mass 13 which arrives on the conveyor belt 7 in the form of a continuous strand, is at any rate well and thoroughly masticated. Instead of the slide provided at the discharge end of known plants, in the case of the device in accordance with the invention, discharging and smoothing screws are attached to the masticators because hereby, a contamination of the steel strips is completely eliminated.

Figure 4:
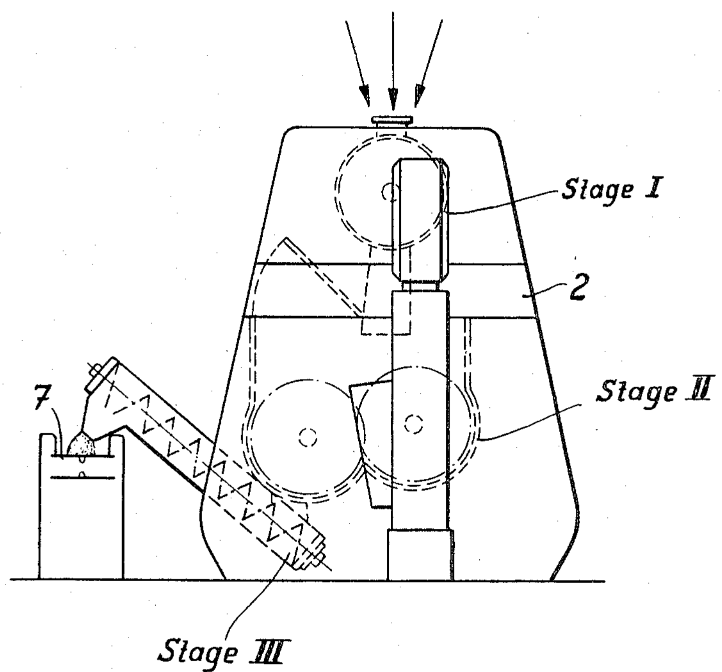
FIG. 4 is a side view of another apparatus to carry out the process.

If the height of the ceiling is not sufficient to erect a three-stage masticating plant, the third mastication stage may be arranged obliquely whereby the overall height is reduced. But in such a case it will no longer be possible to have the conveyor belt pass along below the masticating plant. The masticating plant must then be arranged in parallel with the conveyor belt. The maximum angle of the upwardly sloping third stage may be selected to have a value up to 45°. A side view of such a device is shown in FIG. 4. Supply of components; program controls via the program switching device, premixing in stage I; weighing by means of the weighing machine 2; main mastication in stage II; after-mastication in stage III are all carried out exactly as is the case with the device shown in FIG. 3. However, in the embodiment shown in FIG. 4, the after-mastication stage is arranged at a slope with respect to the horizontal, namely up to a maximum angle of 45°. Owing to this inclination, it will be possible to construct the entire plant to have a lower height. The mass arrives finally on the conveyor belt 7.

Finally, the electrical control system for the device in accordance with the invention will be described: The starting of the masticating plant begins at stage II. The stages II and I are interlocked with respect to each other in such a way that a switching-on can occur only in the sequence II–I. The overload switches of the individual stages are connected in series so that, with the failure of one stage, all the other stages will automatically be cut-off. When the third stage is switched-off by outside control means, the first two stages will likewise switch off. The control voltage for the weighing machine will be available only after the first stage has been switched on, because otherwise a weighing would be possible with the machine at a standstill.

In the program switching device, the adjustment of the impulse counters, namely for the number of charges for starting the machine; for the total number of charges is effected; a third impulse counter is set on zero so that the discharge per day, per week or month may be established. The first mentioned counters are counting backwards with each impulse, the last one is counting forwards. Thereupon, the weighing machine is adjusted in a manner known per se in connection with punch cards.

The starting of the weighing machine takes place after the starter key has been actuated. The weighing action is beginning, the contactor for a feeding screw is switched on via the punch card control. After the first component has been weighed, a shifting is effected from component 1 to component 2 by the program switch; for instance in the form of a punch card control. After the last component has been supplied, the slide from stage I to stage II is opened by the program switch, for instance by a punch at the end of the card for the filling weight. The slide opens to the end position and is then brought to a standstill by means of a limit switch fitted at the slide. The slide motor receives a closing impulse when stage I has been completely emptied. The closed slide then gives a command for the second weighing-in operation via a limit switch at the weighing machine. After four to six charges have been made, said number being adjusted in the impulse counter, the weighing machine will come to a standstill. The premixing operation has been finished. The stage II has been completely filled with mass and the material to be mixed has meanwhile been well and thoroughly masticated.

Thereupon, stage III will be switched on. It is only now that it is possible to open the slide at stage II which opening is effected via a push button. The opening width of the slide 6 is governed by the requirements prevailing at the rolling mills. The slide 6 is in addition coupled with limit switches which are provided at certain distances from each other. All the limit switches are connected with respective cams of a program switching device. The program switching device determines the calling time from the premixing stage. Therefore, the interval of time during which the slide 4 between the stage I and II is opened, is directly dependent on the opening width of the slide 6 between the stages II and III. The stage III discharges the well masticated mass at the end in the form of a strand of an order of size of about 100 x 60 mm. The strand falls directly onto the running strip, with the speed of the strip being controlled to be such that the strand will rupture at a length of about 50 cm.

The process and the device in accordance with the invention offer the advantage that the masticating time of the mass may be adjusted in accordance with the mass being processed, bitter chocolate, for instance, requires a masticating period of 10 to 15 minutes; milk chocolate requires a masticating period of 25 to 30 minutes. The mass will not become too liquid nor too solid but will, moreover, be in the respective condition most favourable for the rolling process. This advantage is brought about by the process in accordance with the invention owing to the fact that the masticating and dwelling time, respectively, may be controlled in the second stage. It is in addition possible with the process in accordance with the invention to also process masses having a fat content down to a value of 20 to 21% total fat content, while the known continuous process may be carried out only with masses having fat contents from 26% on. Moreover, the accuracy with which the masses are weighed-in is substantially more favourable than is the case with known processes.

What I claim is:

1. A method for producing chocolate mass in a masticating plant from individual components, comprising the steps of preselecting the weights of said individual components by means of a program switching device, weighing said components in a predetermined sequence within a premasticating zone and premixing said components for a given time interval after the desired total weight has been reached, controllably conveying the premixed mass to a main masticator to maintain a preselected amount of mass within the main masticator, masticating said mass for a given time interval in the main masticator, continuously controllably conveying the masticated mass to an after-masticator, after-masticating said masticated mass, and continuously discharging said mass onto conveyor means.

2. A method for producing chocolate mass in a masticating plant from individual components, comprising the steps of preselecting the weights of said individual components by means of a program switching device, weighing said components in a predetermined sequence within a premasticating zone and premixing said components for a given time interval after the desired total weight has been reached, conveying the premixed mass to a main masticator, masticating said mass for a given time interval in said main masticator, weighing and premixing a new batch of components while masticating said mass, sensing the amount of mass present in said main masticator, continuously conveying the masticated mass to an after-masticator, after-masticating said masticated mass, discharging the after-masticated mass in the form of a strand onto conveyor means, and introducing new premixed masses into the main masticator at a rate dependent upon the rate the masticated mass is conveyed to the after-masticator to maintain a substantially constant amount of mass within said main masticator.

3. A method for producing chocolate mass in a masticating plant from individual components, comprising the steps of preselecting the weights of said individual components by means of a program switching device, weighing said components in a predetermined sequence within a premasticating zone and premixing said components for a given time interval after the desired total weight has been reached, conveying the premixed mass to a main masticator, sensing the amount of the mass present in said main masticator, controlling the rate premixed mass is conveyed to said main masticator in accord with the amount of mass within said main masticator, masticating said mass for a given time interval in said main masticator, continuously conveying the masticated mass to an after-masticator, after-masticating said masticated mass, and discharging the mass in the form of a strand onto conveyor means.

4. A masticating plant for continuously producing chocolate mass from individual components comprising, in combination, component dispensing means, programmed switching means controlling operation of said dispensing means, premasticating means receiving the components from said dispensing means, weighing means connected to said switching means and associated with said premasticating means sensing the weight of the components within said premasticating means, main masticating means, mass level sensing means located within said main masticating means connected to said switching means, first mass conveying means controllably connected to said switching means selectively permitting flow of premixed mass from said premasticating means to said main masticating means, after-masticating means, second mass conveying means controllably connected to said switching means selectively permitting flow of the mass from said main masticating means to said after-masticating means and third mass conveying means receiving the mass from said after-masticating means.

5. In a masticating plant as in claim 4 wherein said premasticating means includes a cylindrically shaped trough defined therein, a single shaft mixing roll rotatably located within said trough and motor means connected to said roll.

6. In a masticating plant as in claim 4 wherein a pair of cylindrically shaped troughs are defined in said main masticating means, said troughs intersecting each other, a mixing shaft rotatably mounted in each of said troughs and mixing paddles mounted on said shafts, said paddles intermeshing upon rotation of said shafts, and means adapted to rotate said shafts.

References Cited

UNITED STATES PATENTS

| | | | |
|---|---|---|---|
| 2,711,964 | 6/1955 | Wiemer | 99—236 |
| 3,173,504 | 3/1965 | Thorsson | 177—70 |
| 3,216,375 | 11/1965 | Ernst | 259—41 X |

FOREIGN PATENTS

| | | |
|---|---|---|
| 658,087 | 10/1951 | Great Britain. |

A. LOUIS MONACELL, *Primary Examiner.*

D. M. NAFF, *Assistant Examiner.*